Patented Jan. 23, 1945

2,367,877

UNITED STATES PATENT OFFICE 2,367,877

CATALYST PREPARATION

Edwin T. Layng, Jersey City, N. J., assignor to The Polymerization Process Corporation, Jersey City, N. J., a corporation of Delaware No Drawing. Application February 29, 1940, Serial No. 321,523

7 Claims. (Cl. 252—251)

This invention relates to catalytic contact material of improved characteristics and the method for producing the same. More particularly, the invention relates to improved catalytic contact material comprising a metal pyrophosphate as an essential ingredient, and the process for the manufacture of such improved catalytic contact material.

Certain metal pyrophosphates including those of copper, mercury, zinc, magnesium, iron, aluminum and cobalt are capable of promoting the conversion of olefins to higher boiling hydrocarbon products. These pyrophosphates become active in the promotion of the conversion reactions by the formation therein of an active modification which is probably the true catalyst for the reaction. Formation of the active modification probably involves reduction reactions such as, in the case of copper pyrophosphate, reduction of the copper from the cupric to the cuprous state. These reduction reactions are brought about by contact with the hydrocarbon reactants under reaction conditions or may be effected previous to the polymerization treatment by suitable reduction treatment with hydrogen.

The active pyrophosphates mentioned above are employed advantageously in the form of granular masses which may be formed by any suitable means. The pyrophosphates are employed in the granular form in order that the fluid reactants may be passed through the granular mass at relatively high velocity and without excessive pressure drop.

In connection with the use of the metal pyrophosphates mentioned above in the form of granules it is found that during the conversion treatment the granules become softened whereby they collapse or disintegrate. This results in gradual consolidation of the contact mass. Consolidation may promote the accumulation of carbonaceous deposits on the surface of the contact material, and does increase the pressure drop through the mass of contact material. These effects are unfavorable to the continuation of the polymerization treatment since they decrease the rate of conversion and, as a result, the treatment must be terminated before it would be necessary if the granular mass of catalytic material did not become softened with resulting collapse and disintegration.

It is an object of the present invention to provide catalytic contact material, and a method for preparing the same, which comprises as an active ingredient one or more of the above-mentioned pyrophosphates in the form of a granular mass consisting of granules which are less susceptible to collapse and disintegration than are granules consisting substantially entirely of one or more of the active metal pyrophosphates.

In accordance with the present invention an improved catalytic contact material is prepared in the form of a granular mass wherein the individual granules consist of a mixture of one or more of the active pyrophosphates and a finely divided supporting material which is inert to the metal pyrophosphates and their reduction products. In accordance with the present invention this intimate mixture is effected by forming an aqueous suspension of the supporting material and effecting the precipitation, in said suspension, of a metal pyrophosphate which is, as stated above, capable of reduction to a polymerization catalyst. The resulting intimate mixture of metal pyrophosphate and finely divided supporting material is separated and thereafter formed into pellets preferably with other procedural steps which will be described in more detail below.

The supporting materials employed should be non-reactive with the pyrophosphate employed as an essential active ingredient of the catalytic material and should not be otherwise reactive under the conditions of operation. In addition to these general requirements the supporting material should not be reactive with the active modifications or reduction products of the pyrophosphates which are formed during the conversion operation. This requirement necessitates avoiding the use of large classes of materials which have been suggested previously for use as supporting materials for polymerization catalysts, such as silica, kieselguhr, alumina, clay, etc. Materials which are suitable as supporting material in accordance with the foregoing requirements include normal and acid salts of ortho-, pyro-, and meta-phosphoric acids which are not substantially reducible under the conversion conditions such as the phosphates of calcium, strontium, barium, titanium, zirconium, thorium, silicon, germanium, tin and lead. In addition to these phosphates other suitable salts may be employed such as certain heavy metal sulphates including barium sulphate and calcium sulphate. Carbonaceous materials are particularly suitable as supporting materials because of their stability under the conditions of operation, their relative porosity and the ease with which they may be obtained as, or preformed into, granules of the desired size and porosity. Carbonaceous material formed by the charring of wood or other organic materials, carbonaceous residues from the distillation of petroleum oils, various cokes made by the carbonization of coals, asphalts, petroleum residues, etc., or naturally occurring carbonaceous materials of suitable characteristics may be employed. Finely divided wood charcoal, particularly in an activated form, is excellently suited for the purpose provided that it does not contain large amounts of free alkali or alkaline salts.

The supporting materials are employed in a finely divided form and generally should be subdivided to pass easily a 200 mesh screen. Preferably, for maximum granular strength they should be in a form wherein the particles have an average diameter not greater than approximately fifty microns.

In the preparation of the improved catalytic material the finely divided supporting material is suspended in a solution of one of the reactants to be employed in effecting the precipitation of the desired metal pyrophosphate. With such finely divided material the suspension may be maintained with mild stirring. The solution of the other reagent is then added to the suspension with stirring to effect the reaction which results in the precipitation of the desired metal pyrophosphate.

In connection with certain of the metal pyrophosphates, particularly copper pyrophosphate, it is desirable to employ the reagents, such as a soluble pyrophosphate and a soluble metal salt, in proportions such that there is no excess of the soluble pyrophosphate over the amount necessary to react with all of the metal salt present. Preferably an excess of the metal salt is employed. This precaution is necessary because certain of the soluble pyrophosphates, such as sodium pyrophosphates, form double salts with the active metal pyrophosphates, excepting that of mercury. The presence of such double salts in the catalytic contact material during the conversion treatment appears to retard initiation of reduction of the metal pyrophosphate to the active form. For example, in the use of copper pyrophosphate prepared under conditions which result in the presence of the double salt of sodium pyrophosphate and copper pyrophosphate it is found necessary to heat the contact material to a relatively high temperature in the presence of the hydrocarbon reactants in order to initiate the polymerization reaction although thereafter the reaction proceeds at the more desired lower operating temperatures.

In further observance of precautions to avoid the presence of the double salt it is desirable to effect thorough mixing of the soluble pyrophosphate solution with the metal salt solution, and this may be supplemented by mild digestion of the mixed solutions. Furthermore, it is desirable to mix the solutions by pouring the solution of the soluble pyrophosphate, such as sodium pyrophosphate, into the metal salt solution whereby there is maintained during the mixing operation an excess of the metal salt in relation to the soluble pyrophosphate. Advantageously, the finely divided supporting material is suspended in a solution of the metal salt, and while the suspension is maintained the soluble pyrophosphate solution is added thereto with stirring.

In the use of finely divided activated wood charcoal as supporting material it is found that granules prepared in accordance with the present invention and consisting of the desired metal pyrophosphate and approximately 25 to 40 per cent of the charcoal possess a resistance to softening and disintegration during the polymerization treatment which substantially exceeds that of granules containing lesser or greater proportions of the charcoal. Preferably, the granules should consist of approximately one third by weight of the finely divided wood charcoal and two thirds by weight of the metal pyrophosphate.

The invention will be described further in connection with specific examples relating to specific metal pyrophosphates and specific supporting materials. It is to be understood, however, that the invention is not limited in scope to the use of these materials but includes the use of other suitable supporting materials and other active metal pyrophosphates as defined above.

Example I

A copper sulphate solution is formed by dissolving 1261 grams of copper sulphate ($CuSO_4.5H_2O$) in 10 liters of water. A sodium pyrophosphate solution is formed by dissolving 665.5 grams of sodium pyrophosphate ($Na_4P_2O_7$) in 15 liters of water. 400 grams of finely divided activated wood charcoal, the particles of which have an average diameter not substantially greater than fifty microns, are stirred into the copper sulphate solution and maintained in suspension by mild stirring. The sodium pyrophosphate solution is then added with stirring, and the mixture stirred for several hours to insure complete reaction. The resulting mixture of finely divided carbon and copper pyrophosphate is filtered and then preferably washed and filtered one or more times with water. Excess water is then removed from the filter cake by suction and the partially dried filter cake is heated for several hours at 220°, for example, on a steam bath with occasional mixing until its water content is 50 per cent by weight. The partially dried filter cake is then further mixed to insure uniformity, for example, by forcing it through an 8 mesh sieve. The resulting granular mass is then extruded through a $\frac{3}{32}$ inch die. The extruded rods are dried at 220° F. for 24 hours and then cut into $\frac{3}{32}$ inch sections. The carbon content of this material is approximately 33 per cent by weight and its apparent density is approximately 0.57.

Catalytic contact material prepared in accordance with Example I was employed in the polymerization treatment of a hydrocarbon gas mixture containing propane, propylene, butylenes and butanes in varying proportions. The gas was passed through the granular mass of catalytic contact material under a pressure of 800 pounds per square inch at rates varying from 250 to 1000 volumes per volume of contact material per hour. At a temperature of 400° F. a conversion of olefins equivalent to 93.5 per cent of the olefin content of the feed gas was obtained. The run was terminated after nearly 1600 hours of operation at which time a total polymer production of 131 gallons per pound of catalytic contact material was obtained.

Example II 1610 grams of mercuric acetate ($Hg(C_2H_3O_2)_2$) were dissolved in 10 liters of water. 665.5 grams of sodium phosphate ($Na_4P_2O_7$) are dissolved in 15 liters of water. Petroleum coke is crushed to about 8 mesh size, baked at 700° F. in air for several hours to remove volatile matter and then cooled to room temperature. The coke is then ground, for example, in a ball mill sufficiently fine to pass a 270 mesh sieve. Finely divided carbon thus prepared is suspended in the sodium pyrophosphate solution by means of slow stirring. The mercuric acetate solution is then added rapidly with stirring, and the stirring is repeated for several hours to insure complete reaction. The resulting mixture is then filtered, and the filter cake after washing and refiltering is partially dried by suction and then dried over a steam bath with occasional stirring to a water content of approximately 55 per cent by weight. The partially dried filter cake after further mixing to insure uniformity is then extruded through a $\frac{5}{32}$ inch die. The extruded rods are dried, for example at 220° F. for 24 hours; and then cut into $\frac{5}{32}$ inch sections. Material thus prepared has an apparent density of approximately 0.48 and a carbon content of approximately 33 per cent by weight.

In the preparation of the mixture of precipitated metal pyrophosphate and finely divided supporting material for extrusion it is found necessary to maintain the water content between 40 and 60 per cent by weight in order to produce pellets of sufficient strength. In general it is noted that the apparent density of the dried pellet is a direct function of the water content of the extruded mixture, higher densities being associated with lower percentages of water. The mechanical strength of the pellets is improved with increasing apparent density.

The individual granules of the catalytic material may have an average diameter of one to twenty-five millimeters. In the preferred form of the invention the catalytic material comprises granules which have an average diameter of three to ten millimeters. Each granule consists of a multiplicity of particles of supporting material, which are much smaller in size than the granule and preferably have an average diameter not in excess of about fifty microns, intimately mixed with one or more active metal pyrophosphates. Each granule of catalytic material, therefore, has an average diameter at least ten times the average diameter of the particles of supporting material contained therein. In the use of the relatively porous wood charcoal supporting material the metal pyrophosphate probably is partially deposited within the pores of the supporting material, the remainder being located in the spaces between adjacent particles of supporting material. Each granule contains a large number of particles of supporting material, which may vary from approximately one hundred to one thousand or more, depending upon the relative size of the granules of catalytic material and the individual particles of supporting material. The granules may be formed by any suitable means, but the extrusion method described in the foregoing example is preferred. For example, the material may be extruded into rods having a diameter not greater than about three to ten millimeters, which after drying may be cut or broken into lengths not substantially greater than three to ten millimeters.

The material prepared in accordance with the present invention consists of individual granules, which exhibit a resistance to disintegration and collapse in the polymerization of olefins, which is much greater than that of granules of the active metal pyrophosphates alone. Large masses of the granular catalytic material prepared in this manner may be employed in the conversion treatment of hydrocarbons during operating runs of long duration whereby it is possible to obtain a very large proportion of polymers per unit cost of catalytic material.

I claim:

1. A method for making granular material containing copper pyrophosphate which comprises forming an aqueous solution of a soluble copper salt, suspending in said solution finely divided supporting material inert to said copper pyrophosphate and its reduction products, adding to said suspension with stirring a soluble pyrophosphate capable of reacting with said copper salt to precipitate copper pyrophosphate and form an intimate mixture of the copper pyrophosphate and finely divided supporting material, limiting the amount of the soluble pyrophosphate added to the solution to a quantity not greater than the amount necessary to react with all the copper salt in said solution whereby the presence of a double salt of the soluble pyrophosphate and copper pyrophosphate in the precipitate is avoided, separating the resulting mixture of copper pyrophosphate and finely divided supporting material from excess water, and forming said mixture into granules.

2. A method for making granular material containing copper pyrophosphate which comprises forming an aqueous solution of a soluble copper salt, suspending in said solution finely divided carbonaceous supporting material inert to said copper pyrophosphate and its reduction products, adding to said suspension with stirring a soluble pyrophosphate capable of reacting with said copper salt to precipitate copper pyrophosphate and form an intimate mixture of copper pyrophosphate and finely divided supporting material, limiting the amount of the soluble pyrophosphate added to said solution to a quantity not greater than the amount necessary to react with all the copper salt in said solution whereby the presence of a double salt of said soluble pyrophosphate and copper pyrophosphate in the precipitate is avoided, separating the resulting mixture of copper pyrophosphate and finely divided supporting material from excess water, and forming said mixture into granules.

3. A method for making granular material containing copper pyrophosphate which comprises forming an aqueous solution of a soluble copper salt, suspending in said solution finely divided charcoal inert to copper pyrophosphate and its reduction products, adding to said suspension with stirring a soluble pyrophosphate capable of reacting with said copper salt to precipitate copper pyrophosphate and form an intimate mixture of copper pyrophosphate and finely divided charcoal, limiting the amount of the soluble pyrophosphate added to said solution to a quantity not greater than the amount necessary to react with all the copper salt in said solution whereby the presence of a double salt of said soluble pyrophosphate and copper pyrophosphate in the precipitate is avoided, separating the resulting mixture of copper pyrophosphate and finely divided charcoal from excess water, and forming said mixture into granules.

4. A method for making granular material containing copper pyrophosphate which comprises forming an aqueous solution of a soluble copper salt, suspending in said solution finely divided carbonaceous supporting material inert to copper pyrophosphate and its reduction products and consisting of particles whose average diameter is not substantially greater than 50 microns, adding to said suspension with stirring a soluble pyrophosphate capable of reacting with said copper salt to precipitate copper pyrophosphate and form an intimate mixture of copper pyrophosphate and finely divided carbonaceous supporting material, limiting the amount of the soluble pyrophosphate added to said solution to a quantity not greater than the amount necessary to react with all the copper salt in said solution whereby the presence of a double salt of said soluble pyrophosphate and copper pyrophosphate in the precipitate is avoided, separating the resulting mixture of copper pyrophosphate and finely divided supporting material from excess water, and forming said mixture into granules.

5. A method for making granular material containing copper pyrophosphate which comprises forming an aqueous solution of a soluble copper salt, suspending in said solution finely divided supporting material inert to copper pyrophosphate and its reduction products, adding to said suspension with stirring a soluble pyrophosphate capable of reacting with said copper salt to precipitate copper pyrophosphate and form an intimate mixture of copper pyrophosphate and finely divided supporting material, limiting the amount of the soluble pyrophosphate added to said solution to a quantity not greater than the amount necessary to react with all the copper salt in said solution whereby the presence of a double salt of said soluble pyrophosphate and copper pyrophosphate in the precipitate is avoided, separating the resulting mixture of copper pyrophosphate and finely divided supporting material from excess water, forming said mixture into granules, and regulating the proportions of reagents and finely divided supporting material in said suspension whereby said granules after drying consist of 25 to 40 weight per cent of said finely divided supporting material.

6. A method for making granular material containing copper pyrophosphate which comprises forming an aqueous solution of a soluble copper salt, suspending in said solution finely divided supporting material inert to copper pyrophosphate and its reduction products, adding to said suspension with stirring a soluble pyrophosphate capable of reacting with said copper salt to precipitate copper pyrophosphate and form an intimate mixture of copper pyrophosphate and finely divided supporting material, limiting the amount of the soluble pyrophosphate added to said solution to a quantity not greater than the amount necessary to react with all the copper salt in said solution whereby the presence of a double salt of said soluble pyrophosphate and copper pyrophosphate in the precipitate is avoided, separating the resulting mixture of copper pyrophosphate and finely divided supporting material from excess water, drying the separated mixture of copper pyrophosphate and supporting material to a water content of 40 to 60 weight per cent, thereafter forming the partially dried mixture into granules, and then effecting further substantial dehydration of the granules.

7. A method for making a granular material containing copper pyrophosphate which comprises forming an aqueous solution of a soluble copper salt, suspending in said solution finely divided charcoal whose particles have an average diameter not substantially greater than 50 microns, adding to said suspension with stirring sodium pyrophosphate to precipitate the copper pyrophosphate and form an intimate mixture of copper pyrophosphate and finely divided charcoal, limiting the amount of sodium pyrophosphate added to said suspension to a quantity not greater than the amount necessary to react with all the copper salt in said solution whereby the presence of a double salt of sodium pyrophosphate and copper pyrophosphate in the precipitate is avoided, separating the resulting mixture of copper pyrophosphate and finely divided charcoal from excess water, drying the separated mixture to a water content of 40 to 60 weight per cent, forming the partially dried mixture into granules, further dehydrating the granules to form the desired granular material, and regulating the proportions of reagents and finely divided charcoal in said suspension whereby said granular material contains 25 to 40 weight per cent of said finely divided charcoal.

EDWIN T. LAYNG.